Figure 1:
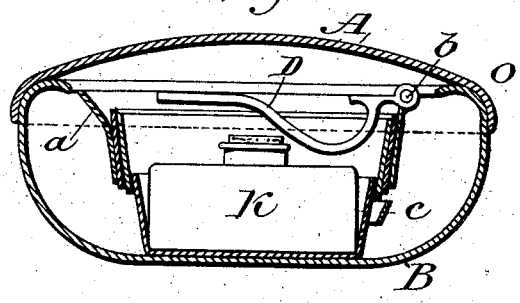

No. 761,559. PATENTED MAY 31, 1904.
E. TOTTEN & H. A. KIMBALL.
PORTABLE TEA STEEPER.
APPLICATION FILED MAY 21, 1903.

NO MODEL.

Witnesses:
Chas. H. Kimball
Mattie E. Dycke

Inventors
Edythe Totten
Hannah Augusta Kimball

No. 761,559. Patented May 31, 1904.

UNITED STATES PATENT OFFICE.

EDYTHE TOTTEN AND HANNAH AUGUSTA KIMBALL, OF NEW YORK, N. Y.

PORTABLE TEA-STEEPER.

SPECIFICATION forming part of Letters Patent No. 761,559, dated May 31, 1904.

Application filed May 21, 1903. Serial No. 158,207. (No model.)

*To all whom it may concern:*

Be it known that we, EDYTHE TOTTEN and HANNAH AUGUSTA KIMBALL, residents of New York city, county of New York, State of New York, have jointly invented a new and useful Portable Tea-Steeper, of which the following is, with the accompanying drawings, a specification.

Our new and conveniently-portable tea-steeper is a combination of the steeper, which is composed of a series of differentiated or telescopic rings, with an alcohol-receptacle, these being so constructed and adjusted that the cover of the infuser and the alcohol-receptacle together form an inclosing box of which each is a member thereof.

Our invention consists in a combination, with a series of differentiated rings including a cup-like ring, of a dish-like receptacle, said receptacle being a projection or extension outward of the lowest part of this cup-like ring, and therefore an integral part of said cup-like ring. The dish-like receptacle encircles the lowest part of the cup-like ring and has its free edges curved slightly inward to conserve the heating force of the alcohol-flame. Said dish-like receptacle is intended to hold alcohol either in a free state or poured over the gauze (wire) article now in use. The cup-like ring of our collapsible tea-steeper has a holding capacity or depth at least twice what it would be were the usual gradations of serial differentiation preserved.

To insure complete security from collapse when the steeper is extended for use, a slot or catch on the upper part of the lowest or cup-like ring is provided, into which the free end of the handle may be slipped. The handle is attached to the top ring in such manner as permits its folding over to lie within the steeper when the latter is not extended in use.

The uppermost ring of our tea-steeper is provided with not only a cover, but also with a spout $a$ to facilitate easy delivery of contents. For convenience in carrying alcohol necessary for heating purposes a metal bottle is provided, said bottle to have a screw-top and to be of a size and shape that will readily fit into the collapsed steeper and be as readily removed therefrom.

Our invention is illustrated in the drawings accompanying and forming a part of this specification, wherein—

Figure 2:
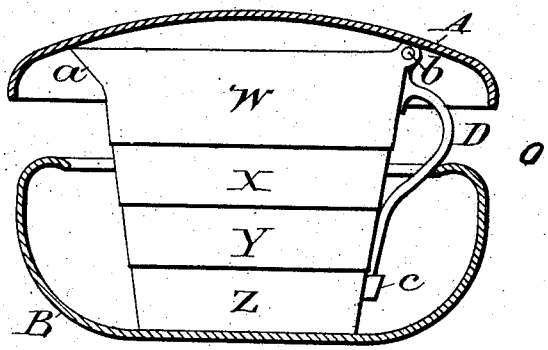

Figure 1 of the drawings is a vertical section of our device, showing the tea-steeper collapsed and sitting within it a metal bottle K for holding alcohol. Fig. 2 is a vertical section of the alcohol-receptacle, showing the steeper in side elevation and as extended when in use.

The pivoted handle D $b$, having a free end, is turned over, and all are inclosed within the box O. The cover A or upper member is so constructed as to admit of its coöperating with the alcohol-receptable B to form an inclosing box.

As shown in Fig. 2, our device with its collapsible infuser (a series of differentiated rings W X Y Z) is extended for use and secured against possible collapse while in use by having the free end of its pivoted handle D engaged with or held by the catch or slot $c$, provided for the purpose.

It will be apparent that the number of rings as well as the details of construction may be varied to suit the necessities of different sizes of this article for domestic use. Therefore we would have it understood that we do not limit ourselves to an exact construction, but hold ourselves at liberty to make such changes and alterations as fairly fall within the spirit and scope of our invention as an article of manufacture.

Having thus described our invention, what we claim as new, and ask to be secured in by Letters Patent, is—

1. In a portable tea-steeper, the combination of an alcohol-receptacle, and a collapsible infuser situated therein, the lower section of said infuser being secured rigidly to said receptacle and provided with a catch, and the upper section thereof being provided with a pivoted handle, the lower end of which being adapted to coöperate with said catch when the infuser is extended.

2. In a portable tea-steeper, the combination of an alcohol-receptacle, and a collapsible infuser situated therein, the lower section of said infuser being secured rigidly to said receptacle and provided with a catch, and the upper section thereof being provided with a pivoted handle, the lower end of which being adapted to coöperate with said catch when the infuser is extended, and a cover for said infuser and receptacle.

3. In a portable tea-steeper, the combination of an alcohol-receptacle having its upper edge curved slightly inward, and a collapsible infuser situated therein, the lower section of said infuser being secured rigidly to said receptacle and provided with a catch, and the upper section thereof being provided with a pivoted handle, the lower end of which being adapted to coöperate with said catch when the infuser is extended.

In testimony whereof we affix our signatures in the presence of witnesses.

EDYTHE TOTTEN.
    HANNAH AUGUSTA KIMBALL.

Witnesses:
 FRANCES BOOTH,
 CHAS. A. KIMBALL.